US011024934B2

(12) United States Patent
Othmezouri et al.

(10) Patent No.: US 11,024,934 B2
(45) Date of Patent: Jun. 1, 2021

(54) THREE-DIMENSIONAL DIELECTRIC STRUCTURE

(71) Applicants: TOYOTA MOTOR EUROPE, Brussels (BE); TEADE AB, Lindome (SE)

(72) Inventors: Gabriel Othmezouri, Brussels (BE); Harald Merkel, Lindome (SE)

(73) Assignees: TOYOTA MOTOR EUROPE, Brussels (BE); TEADE AB, Lindome (SE)

( * ) Notice: Subject to any disclaimer, the term of this patent is extended or adjusted under 35 U.S.C. 154(b) by 0 days.

(21) Appl. No.: 16/489,022

(22) PCT Filed: Feb. 28, 2017

(86) PCT No.: PCT/EP2017/054674
§ 371 (c)(1),
(2) Date: Aug. 27, 2019

(87) PCT Pub. No.: WO2018/157920
PCT Pub. Date: Sep. 7, 2018

(65) Prior Publication Data
US 2019/0379096 A1    Dec. 12, 2019

(51) Int. Cl.
*H01P 3/16* (2006.01)
*H01P 1/213* (2006.01)
*H01P 5/00* (2006.01)
*H01Q 15/00* (2006.01)

(52) U.S. Cl.
CPC ............... *H01P 3/16* (2013.01); *H01P 1/213* (2013.01); *H01P 5/00* (2013.01); *H01Q 15/0086* (2013.01)

(58) Field of Classification Search
CPC .... H01P 3/16; H01P 3/20; H01P 1/213; H01P 5/00; H01Q 15/0086; H01Q 15/0006; H01Q 15/00
See application file for complete search history.

(56) References Cited

U.S. PATENT DOCUMENTS 3,823,997 A    7/1974  Gloge et al.
4,919,504 A    4/1990  Colas et al.

FOREIGN PATENT DOCUMENTS

CN    105 500 719 A    4/2016

OTHER PUBLICATIONS

J.W. Allen, et al., "Design and fabrication of an RF GRIN lens using 3D printing technology", Proceedings of SPIE, Feb. 2013, pp. 86240V-1-86240V-7, vol. 8624.
(Continued)

*Primary Examiner* — Stephen E. Jones
(74) *Attorney, Agent, or Firm* — Sughrue Mion, PLLC

(57) ABSTRACT

The present disclosure relates to a three-dimensional dielectric structure comprising at least one input and at least one output configured to transmit electromagnetic waves of at least one predetermined wavelength, a metamaterial between the at least one input and the at least one output comprising a substrate and objects with a predetermined dielectric characteristic different to the dielectric characteristic of the substrate, the objects being distributed in the substrate according to a spatially varying distribution function that depends on the wavelength. The disclosure further relates to a method of forming a three-dimensional dielectric structure.

13 Claims, 2 Drawing Sheets

(56) References Cited

OTHER PUBLICATIONS

Derek Doyle, et al., "Dielectric Characterization of 3D Printed Materials with a Confocal Fabry Perot Resonator for Space Utilization", IEEE Antennas and Propagation Society International Symposium (APSURSI), Jul. 6, 2014, pp. 223-224.
International Search Report for PCT/EP2017/054674 dated Nov. 21, 2017 (PCT/ISA/210).
Written Opinion for PCT/EP2017/054674 dated Nov. 21, 2017 (PCT/ISA/237).

THREE-DIMENSIONAL DIELECTRIC STRUCTURE

CROSS REFERENCE TO RELATED APPLICATIONS

This application is a National Stage of International Application No. PCT/EP2017/054674 filed Feb. 28, 2017.

FIELD OF THE DISCLOSURE

The present disclosure is related to three-dimensional dielectric structures, in particular configured for a THz and/or submillimeterwave signal manipulation, and more particularly to a waveguide, e.g. usable in terahertz radar antennas.

BACKGROUND OF THE DISCLOSURE

Conventional electronic circuits are organized in two dimensional structures. A typical circuit consists of a set of units. Each unit is designated to perform certain tasks on ingoing signals and couples the processed signal to outgoing signals. Signals are transported using wires, connectors or traces on printed circuits. Signals interlinking units are constructed in the same way. There are cases where specialized circuitry is needed to convert signals from the level space provided in one unit to another one. The simplest case is the usage of dc block circuitry to adjust prescribed static voltage values on lines, where high frequency signals are transferred.

However, for higher frequency signals (>100 GHz) traditional lines exhibit radiation and dielectric losses: Wires and connectors radiate and the available substrates for printed circuitry become lossy.

As circuits get more and more complex, more interconnects between units are required. Each interconnect adds up to the system cost and reduces reliability. Today, interconnects are the major cause of failure.

Doubling the complexity of electronic circuit doubles the number of components but quadruples the number of interconnects and their length. Placing these interconnects in a plane is limited by space. Therefore three dimensional circuits are required.

Any electromagnetic system consists of a collection of inputs and outputs. Between these, specific operations take place. Today, these operations are realized by a set of devices and interconnects. Each interconnect and device is designed by its own field problem solutions.

Further approaches are known, e.g. "Homogenization principles and effect of mixing on dielectric behavior" by Ari Sihvola, Photonics and Nanostructures vol. 11 #4 2013 discloses homogenization approach and the Maxwell-Garnett process.

"Electromagnetic waves in chiral and bi-isotropic media", by Lindell, Sihvola, Tretyakov, Viitanen, Artech House 1994 discloses coupling between electric and magnetic fields by material properties.

U.S. Pat. No. 3,823,997 A describes a graded-index optical fiber.

From U.S. Pat. No. 4,919,504 A Graded-index waveguides are known.

Furthermore the book "Photonic Crystals: Molding the Flow of Light" by John D. Joannopoulos et al., PRINCETON UNIVERSITY PRESS (1995) discloses periodic structures created in materials to achieve specific properties.

SUMMARY OF THE DISCLOSURE

Currently, it remains desirable to provide a technology for three dimensional interconnects and passive components between components, in particular operating in the millimeterwave, submillimeterwave and THz regime.

Therefore, according to embodiments of the present disclosure, a dielectric structure is provided comprising at least one input and at least one output configured to transmit electromagnetic waves of at least one predetermined wavelength. A metamaterial between the at least one input and the at least one output comprises a substrate and objects with a predetermined dielectric characteristic different to the dielectric characteristic of the substrate. The objects are desirably distributed in the substrate according to a spatially varying distribution function that depends on the wavelength.

Accordingly, the present disclosure offers a way to achieve three dimensional interconnects and three dimensional passive components. The strict separation between individual devices is removed.

Any electromagnetic system consists of a collection of inputs and outputs. Between these, specific operations take place. In the present disclosure the complete system is treated as a single field problem. The local dielectric properties of the system are obtained to fulfil the overall operations required between the ports. There is no longer a distinction between interconnect and device. To achieve this, objects smaller than the wavelength may be used. These objects have a dielectric property different from a substrate. The objects may be embedded into the substrate with arbitrary density forming a three-dimensional arbitrarily formable dielectric/magnetic profile. For any operation required between the inputs and outputs, a profile is calculated and implemented using said objects.

The objects may be distributed such that the metamaterial comprises: a guiding profile, configured to guide the waves from the input to the output, and/or a filtering profile, configured to filter the waves from the input to the output, and/or a splitting profile, configured to split the waves from the input into at least two different directions, e.g. into at least two outputs, and/or a recombining profile, configured to recombine the waves from at least two different directions, e.g. from at least two inputs, and/or a switching profile, configured to switch the waves from the input to the output, and/or a damping profile, configured to damp the waves from the input to the output, and/or an amplifying profile configured to amplify the waves from the input to the output (e.g. by using nonlinear materials as an additive material in the metamaterial, like a nonlinear bulk material; e.g. InSb and/or Eu doped silica), and/or a beam processing profile, configured to beam process the waves from the input to the output, e.g. configured for mode changing, mode selection and/or Fourier transformation of the waves.

The objects are distributed such that the metamaterial comprises a spatially varying distribution along the guiding profile, the spatially varying distribution being configured to have predetermined wave processing characteristics corresponding to an electronic circuit model or an optical transmission model.

The objects may be distributed such that they form a spatial filter, a hologram, and/or a phase plate, e.g. a kinoform, configured for microwave-millimeterwave- or THz-applications.

The spatially varying distribution function may be defined based on an electronic circuit model such that the dielectric structure is configured to process the electromagnetic waves in correspondence to the electronic circuit model.

The dielectric structure may comprise at least one filter and/or at least one coupler, the filter and/or coupler being represented in the metamaterial by periodic superstructures of the distributed objects that offer transmission to at least one wavelength and not to others.

The spatially varying distribution function may be defined based on an optical transmission model such that the dielectric structure is configured to process the electromagnetic waves in correspondence to the optical transmission model.

The dielectric structure may comprise at least one lense and/or at least one resonator, the lense and/or resonator being represented in the metamaterial by periodic superstructures of the distributed objects that offer transmission to at least one wavelength and not to others.

The dielectric structure may be configured to transmit waves with a predetermined wavelength, e.g. at more than 100 GHz, wherein the objects are provided in the metamaterial in a distance smaller with regard to the wavelength of the radio waves, e.g. with a mean distribution of at least 5 non-linear elements per wavelength, more in particular of at least 20 non-linear elements per wavelength.

The distribution of objects may be assumed to be dense enough that the predetermined wavelength signal propagates approximately in a locally homogenous medium.

The present disclosure further relates to a waveguide comprising a dielectric structure as described above.

The present disclosure further relates to a method of forming a dielectric structure comprising the steps of: determining at least one predetermined wavelength of electromagnetic waves which are to be processed by the three-dimensional dielectric structure, forming a metamaterial with at least one input and at least one output comprising a substrate and objects with a predetermined dielectric characteristic different to the dielectric characteristic of the substrate, wherein the objects are distributed in the substrate desirably according to an anisotropic dielectric function that depends on the wavelength.

The step of forming a metamaterial may comprise: defining an electronic circuit model or an optical transmission model, synthesizing a superstructure of the distributed objects based on the electronic circuit model or the optical transmission model.

The step of forming a metamaterial may comprise: synthesizing a superstructure of the distributed objects based on solving an inverse scattering problem wherein the desired functionality between the location of input and output are used as start values.

The superstructures may be formed by 3D printing.

The objects may be distributed such that they form a spatial filter, a hologram, and/or a phase plate, e.g. a kinoform, configured for microwave-millimeterwave- or THz-applications.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
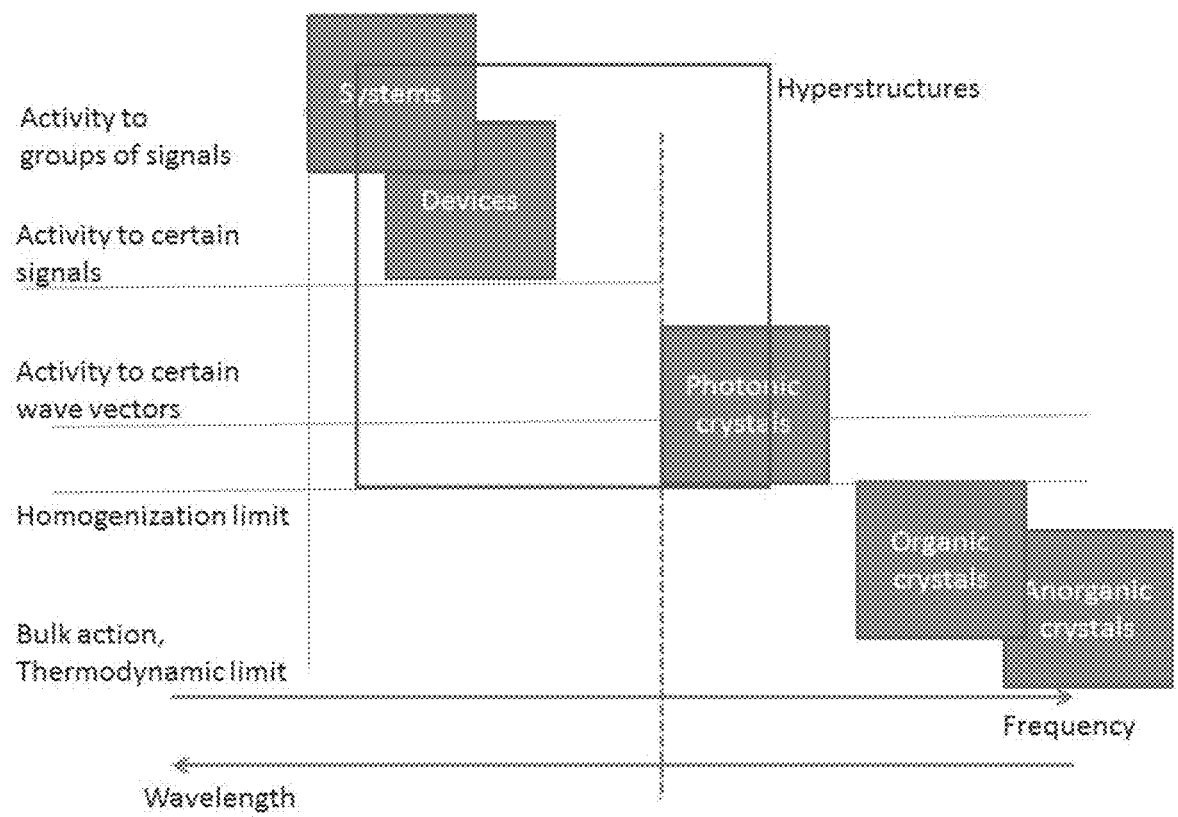
FIG. 1 shows a homogenization diagram of superstructures as background of the present disclosure.

FIG. 1 shows a homogenization diagram of superstructures as background of the present disclosure. Placing dielectric objects smaller than the wavelength of operation in a three dimensional space is known to the Prior Art (c.f. FIG. 1).

Figure 2:
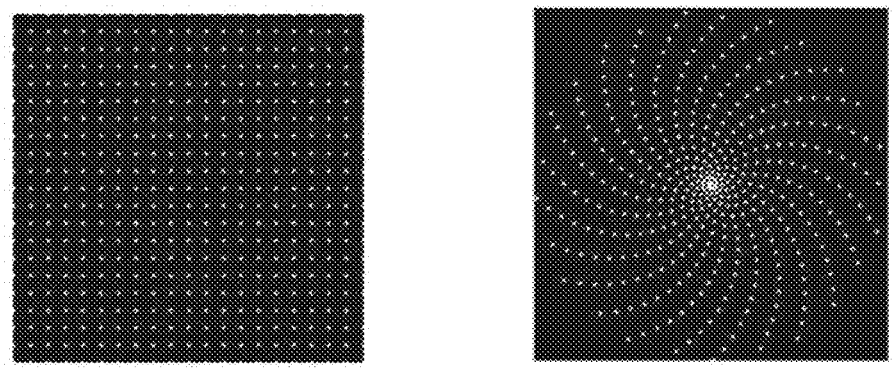
FIG. 2 shows a schematic representation of crystal and random structures as background of the present disclosure.
Figure 2:
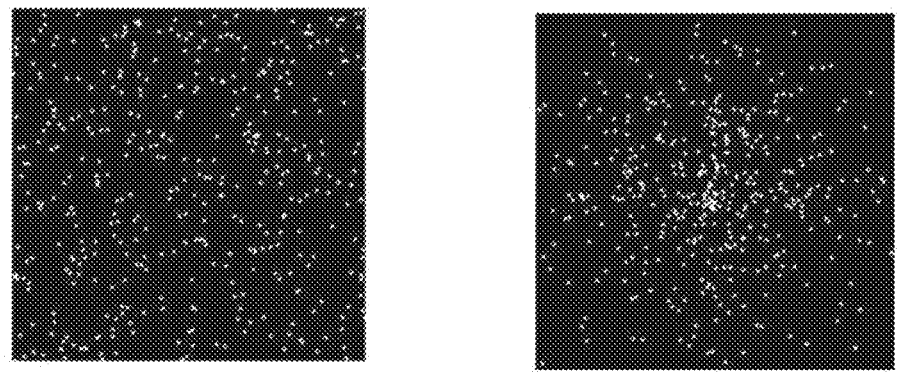

FIG. 2 shows a schematic representation of crystal and random structures according to an embodiment of the present disclosure. Prior Art distinguishes between periodic and random placement (c.f. FIG. 2). Periodic placement at scales comparable to the wavelength leads to photonic crystals, superlattices—certain wave vectors exhibit specific properties giving rise to anisotropy. Random placement at scales comparable and smaller than the wavelength can be described by homogenization. Here the overall dielectric function becomes isotropic. Random placement at scales larger than the wavelength yields individual scatterers. Prior Art is limited to materials where the lattice properties are homogenous. The diffraction properties of metamaterials in Prior art are always assumed to be constant or following simple polynomial gradients. Furthermore, the electromagnetic modelling is done local.

The present disclosure describes a superstructure at length scales around the wavelength of operation and covering hundreds of wavelengths in extent.

This superstructure assigns local distributions of dielectric objects—with individual random, pseudorandom, quasiperiodic or crystalline placements. The material is locally described by an anisotropic dielectric function that depends on wavelength.

It is noted that a pseudorandom sequence may be used to make such a structure. It would nevertheless be possible to use a Geiger counter output as a sequence source as well. In this case also a random sequence may be used to make such a structure.

The superstructure is chosen to create a given functionality between locations on the structure, where radiation is input and other locations on the structure where radiation is output.

Accordingly, the present disclosure offers a way to achieve three dimensional interconnects and three dimensional passive components. The strict separation between individual devices is removed.

Figure 3:
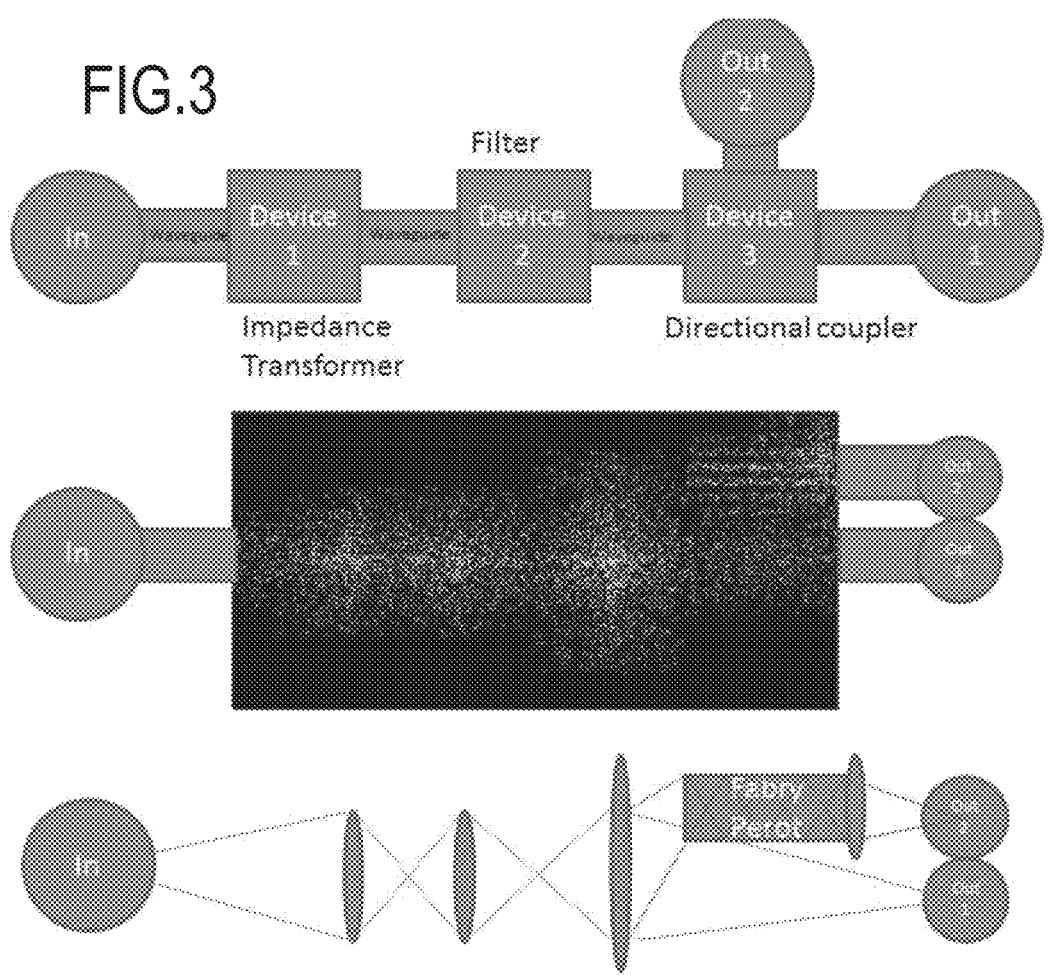
FIG. 3 shows schematic representations of a dielectric structure (center), a corresponding circuit model (top) and a corresponding optics model (bottom) according to an embodiment of the present disclosure.

FIG. 3 shows schematic representations of a dielectric structure (center), a corresponding circuit model (top) and a corresponding optics model (bottom) according to an embodiment of the present disclosure.

The objects are embedded into the substrate with arbitrary density forming a three-dimensional arbitrarily formable dielectric/magnetic profile. For any operation required between the inputs and outputs, a profile is calculated and implemented using said objects (c.f. FIG. 3, center).

The superstructure may be synthesized in a straightforward way by starting with a circuit model (c.f. FIG. 3, top): Waveguide sections in the circuit model are represented by regions of random placement with square law density relations (being equivalent to a gradient index fiber), filters and couplers are represented by periodic superstructures that offer transmission to certain wavelengths and not to others.

The superstructure may also be synthesized in a similar way by starting with an optical equivalent model (c.f. FIG. 3, bottom): free space regions between the individual optical elements are represented by regions of random placement with square law density relations (being equivalent to a gradient index fiber), lenses and resonators are represented by periodic superstructures that offer transmission to certain wavelengths and not to others.

The superstructure may be synthesized by solving an inverse scattering problem where the desired functionality between the location of radiation input and output are prescribed as start values.

Applying superstructures as solution of an inverse scattering problem removes the distinction between individual devices and between interconnects in circuits (c.f. FIG. 3, center part: There is still an overall guiding profile visible that runs in the center of the substrate. The focusing elements are still visible as superimposed elliptic clusters, the Fabry-Perot function is visible close to the second output port. Here functional blocks are overlapping and placement is based on the overall function).

A specific function (or part of a function) is no longer localized in a unique, specific region of the superstructure. Functions overlap. Therefore e.g. focusing elements (requiring a certain focal length) and bandpass elements (requiring a certain layer distance) can be achieved within the same volume effectively reducing size and connection distance. Using superstructures is the most compact way to achieve a given circuit function. Superstructures allow designs that exploit polarization multiplex.

Superstructures allow designs that are useful at more than one operating frequency. Problems with dispersion as seen in photonic crystals can be overcome by using tapered superstructures where a crystalline structure is morphed into a quasiperiodic structure and subsequently in a random structure.

Figure 4:
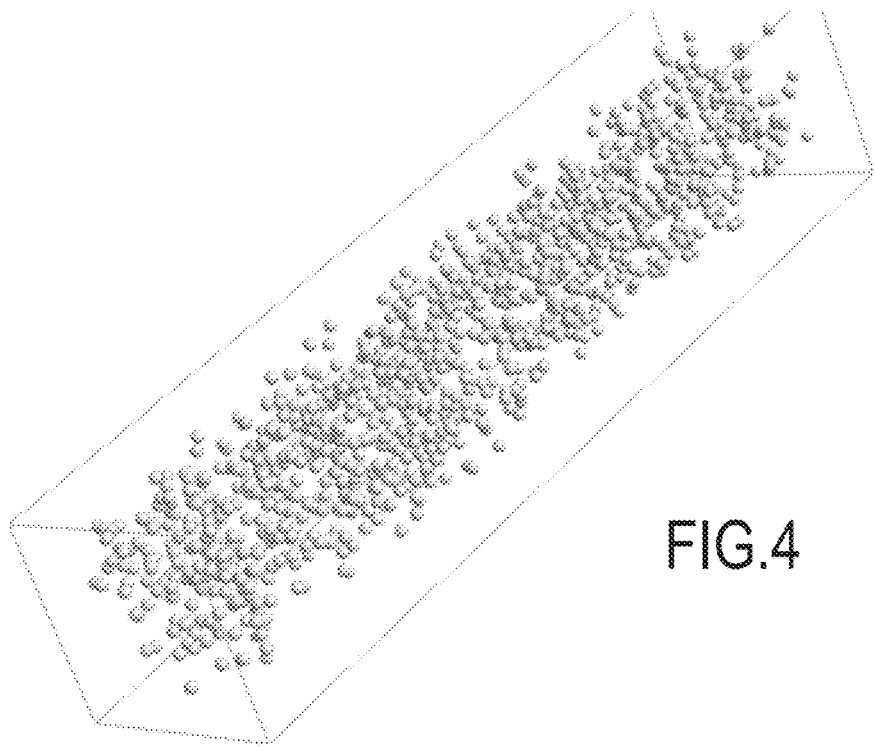
FIG. 4 shows a schematic representation of a waveguide comprising the dielectric structure according to an embodiment of the present disclosure.

FIG. 4 shows a schematic representation of a waveguide comprising the dielectric structure according to an embodiment of the present disclosure.

Today for frequencies above 100 GHz there is no viable method available to transport signals due to fabrication tolerances and due to losses in traditional circuits. Superstructures are three-dimensional in nature and offer therefore a much shorter average transport distance, so even lossy gradient fiber equivalents by particle placement (c.f. FIG. 4) may be useful. Computer power still limits the size of circuit or functionality for which a superstructure distribution can be practically generated. But extrapolating calculation power availability, not only circuits but complete systems will be within reach of synthesis.

Superstructures can be generated easily using 3D printing technology.

For example, the size of the distributed objects may be 200 µm$^3$ to 1 mm$^3$. The distance between the nonlinear objects may be 1 to 10 times of their size and as close as possible. The distance may be 0.1 wavelength of or less of the electromagnetic waves for which the dielectric structure has been designed. A typical wavelength of operation may be 10 cm (at 3 GHz) to 1 mm (at 300 GHz). The typical dimension of the dielectric structure may be 100 cm to 30 mm (i.e. its size in the direction of the processed waves passing the dielectric structure, in other words in the propagation direction of the waves, e.g. the length of the waveguide comprising the dielectric structure).

The dielectric structure may comprise or may consist of any material suitable for 3D printing including 3D printing material that can be washed out after printing. Examples are epoxy, PLA (Polyactide) and/or ABS (Acrylonitrile butadiene styrene).

The objects may be formed as Si (Silicon) particles, e.g. Si particles in epoxy. Alternatively or additionally the objects may be formed as air bubbles, e.g. air bubbles in epoxy. Alternatively or additionally the objects may be formed as air cavities, e.g. air cavities in PLA (Polyactide) and/or ABS (Acrylonitrile butadiene styrene). Throughout the disclosure, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Furthermore the terms like "upper", "upmost", "lower" or "lowest" and suchlike are to be understood as functional terms which define the relation of the single elements to each other but not their absolute position.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A three-dimensional dielectric structure comprising:
   at least one input and at least one output configured to transmit electromagnetic waves of at least one predetermined wavelength; and
   a metamaterial between the at least one input and the at least one output comprising a substrate and objects with a predetermined dielectric characteristic different to the dielectric characteristic of the substrate, the objects being distributed in the substrate according to a spatially varying distribution function that depends on the wavelength,
   and wherein the dielectric structure is configured to transmit waves with a predetermined wavelength, in particular at more than 100 GHz, wherein
   the objects are provided in the metamaterial in a distance smaller with regard to the wavelength of the radio waves, in particular with a mean distribution of at least 5 non-linear elements per wavelength, more in particular of at least 20 non-linear elements per wavelength.

2. The dielectric structure according to claim 1, wherein the objects are distributed such that the metamaterial comprises at least one of:
- a guiding profile, configured to guide the waves from the input to the output,
- a filtering profile, configured to filter the waves from the input to the output,
- a splitting profile, configured to split the waves from the input into at least two different directions, in particular into at least two outputs,
- a recombining profile, configured to recombine the waves from at least two different directions, in particular from at least two inputs,
- a switching profile, configured to switch the waves from the input to the output,
- a damping profile, configured to damp the waves from the input to the output, and
- a beam processing profile, configured to beam process the waves from the input to the output, in particular configured for mode changing, mode selection and/or Fourier transformation of the waves.

3. The dielectric structure according to claim 1, wherein the objects are distributed such that the metamaterial comprises a spatially varying distribution along the guiding profile, the spatially varying distribution being configured to have predetermined wave processing characteristics corresponding to an electronic circuit model or an optical transmission model.

4. The dielectric structure according to claim 1, wherein the objects are distributed such that they form a spatial filter, a hologram, and/or a phase plate, in particular a kinoform, configured for microwave- millimeterwave- or THz-applications.

5. The dielectric structure according to claim 1, wherein the spatially varying distribution function is defined based on an electronic circuit model such that the dielectric structure is configured to process the electromagnetic waves in correspondence to the electronic circuit model.

6. The dielectric structure according to claim 1, wherein the dielectric structure comprises at least one filter and/or at least one coupler,
the filter and/or coupler being represented in the metamaterial by periodic superstructures of the distributed objects that offer transmission to at least one wavelength and not to others.

7. The dielectric structure according to claim 1, wherein the spatially varying distribution function is defined based on an optical transmission model such that the dielectric structure is configured to process the electromagnetic waves in correspondence to the optical transmission model.

8. The dielectric structure according to claim 1, wherein the dielectric structure comprises at least one lens and/or at least one resonator,
the lens and/or resonator being represented in the metamaterial by periodic superstructures of the distributed objects that offer transmission to at least one wavelength and not to others.

9. A waveguide comprising a dielectric structure according to claim 1.

10. A method of forming a three-dimensional dielectric structure comprising the steps of:
- determining at least one predetermined wavelength of electromagnetic waves which are to be processed by the three-dimensional dielectric structure;
- forming a metamaterial with at least one input and at least one output comprising a substrate and objects with a predetermined dielectric characteristic different to the dielectric characteristic of the substrate; and
- distributing the objects in the substrate according to an anisotropic dielectric function that depends on the wavelength, wherein the step of forming a metamaterial comprises:
synthesizing a superstructure of the distributed objects based on solving an inverse scattering problem wherein the desired functionality between the location of input and output are used as start values.

11. The method according to claim 10,
wherein the step of forming a metamaterial comprises:
defining an electronic circuit model or an optical transmission model,
synthesizing a superstructure of the distributed objects based on the electronic circuit model or the optical transmission model.

12. The method according to claim 10,
wherein the superstructures are formed by 3D printing.

13. The method according to claim 10,
wherein the objects are distributed such that they form a spatial filter, a hologram, and/or a phase plate, in particular a kinoform, configured for microwave- millimeterwave- or THz-applications.

* * * * *